US009678278B2

(12) United States Patent
Blaicher et al.

(10) Patent No.: US 9,678,278 B2
(45) Date of Patent: Jun. 13, 2017

(54) INTEGRATED OPTICAL CIRCUIT AND METHODS FOR ITS MANUFACTURING AND RECONFIGURING

(71) Applicant: Karlsruher Institut für Technologie, Karlsruhe (DE)

(72) Inventors: Matthias Blaicher, Ettlingen (DE); Wolfram Pernice, Karlsruhe (DE); Martin Wegener, Karlsruhe (DE)

(73) Assignee: Karlsruher Institut für Technologie, Karlsruhe (DE)

( * ) Notice: Subject to any disclaimer, the term of this patent is extended or adjusted under 35 U.S.C. 154(b) by 3 days.

(21) Appl. No.: 14/698,551

(22) Filed: Apr. 28, 2015

(65) Prior Publication Data

US 2015/0309260 A1    Oct. 29, 2015

(30) Foreign Application Priority Data

Apr. 29, 2014    (EP) .................................... 14166424

(51) Int. Cl.
*G02B 6/30* (2006.01)
*G02B 6/13* (2006.01)
(Continued)

(52) U.S. Cl.
CPC .............. *G02B 6/30* (2013.01); *G02B 6/132* (2013.01); *G02B 6/138* (2013.01); *B82Y 20/00* (2013.01); *G02B 6/1221* (2013.01); *G02B 6/136* (2013.01)

(58) Field of Classification Search
None
See application file for complete search history.

(56) References Cited

U.S. PATENT DOCUMENTS 6,035,080 A     3/2000  Henry et al.
8,895,233 B2 *  11/2014 McLeod ............. G03F 7/70416
                                                       385/14
(Continued)

FOREIGN PATENT DOCUMENTS

EP        1 310 808 A2   8/2007
WO    WO 2004/017546 A2  2/2004

OTHER PUBLICATIONS

Lindenmann, et al.,"*Photonic wire bonding: a novel concept for chip-scale interconnects*," Optics Express, vol. 20, No. 16, pp. 17667-17677 (2012).
(Continued)

*Primary Examiner* — Jerry Rahll
(74) *Attorney, Agent, or Firm* — Foley & Lardner LLP

(57) ABSTRACT

The present invention is related to an integrated optical circuit, in particular, to an optical-field writable array, as well as to methods for its manufacturing and reconfiguring. The integrated optical circuit comprises at least one nanophotonic device and at least one photonic wire, wherein the nanophotonic device comprises a substrate equipped with at least one reception for at least one external connector, wherein the reception is coupled to at least one connector waveguide, and at least one set of nano-optic components, wherein the nano-optic component is one of a nanophotonic waveguide or a nanophotonic component, wherein the nanophotonic component is nano-optically coupled to at least one nanophotonic waveguide, wherein at least one of the nanophotonic waveguides is selectively coupleable to at least one of the connector waveguides, wherein the photonic wire connects at least one of the nanophotonic waveguides to at least one of the connector waveguides.

10 Claims, 3 Drawing Sheets

Figure 1:
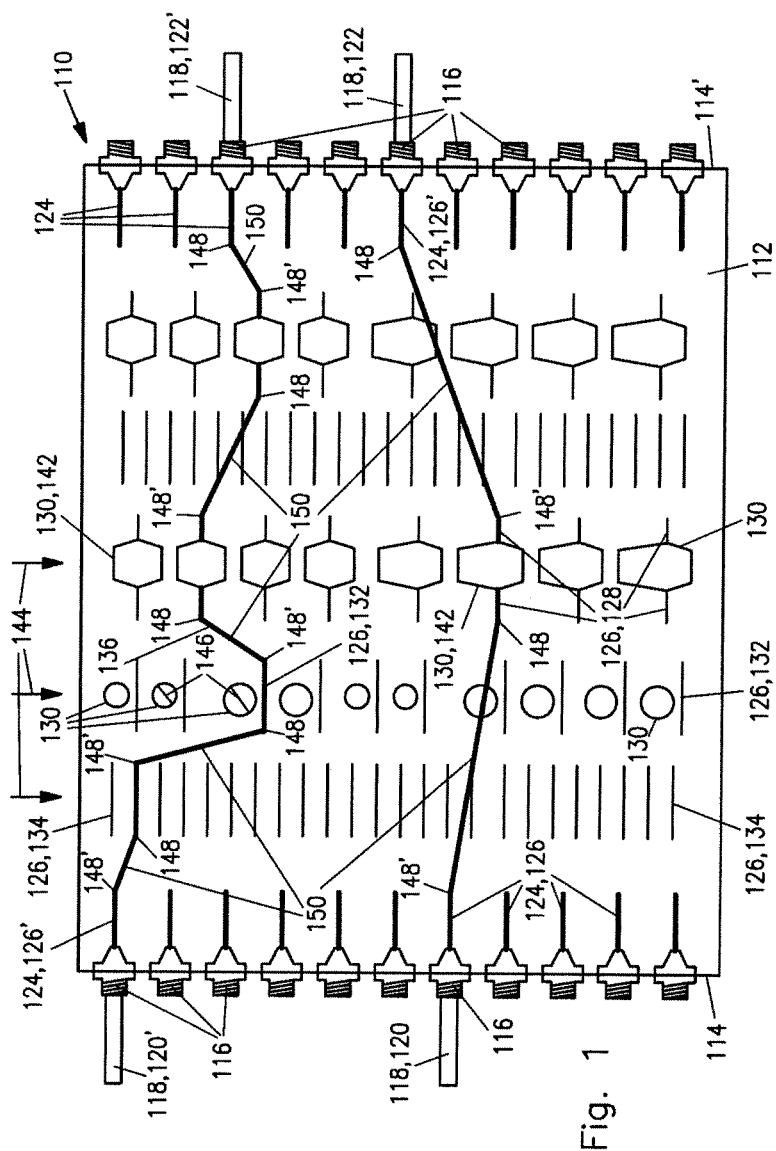

(51) Int. Cl.
*G02B 6/132* (2006.01)
*G02B 6/138* (2006.01)
G02B 6/136 (2006.01)
B82Y 20/00 (2011.01)
G02B 6/122 (2006.01)

(56) References Cited

U.S. PATENT DOCUMENTS 9,478,842 B1 * 10/2016 Decrossas ............... H01P 5/087
2013/0221550 A1  8/2013 Koos et al.
2013/0223788 A1  8/2013 Koos et al.

OTHER PUBLICATIONS

Richard Soref, *Reconfigurable Integrated Optoelectronics*, Advances in OptoElectronics, 15 pages (2011).

* cited by examiner

INTEGRATED OPTICAL CIRCUIT AND METHODS FOR ITS MANUFACTURING AND RECONFIGURING

CROSS-REFERENCE TO RELATED APPLICATION

This application claims priority from European Patent Application No. 14166424.3, filed on Apr. 29, 2014. The contents of this application is incorporated herein by reference in its entirety.

FIELD OF THE INVENTION

The present invention is related to an integrated optical circuit, in particular, to an optical-field writable array. More particular, the present invention refers to a nanophotonic device, an integrated optical circuit which comprises the nanophotonic device, and methods for manufacturing the nanophotonic device and the integrated optical circuit as well as for reconfiguring the integrated optical circuit.

RELATED ART

The present invention is located in the fields of nanophotonics and integrated optics as well as in the fields of nanofabrication and three-dimensional lithography. The particular object of the present invention addresses urgent needs in providing efficient solutions for a nanoscale design of integrated optical circuits.

Currently available reconfigurable integrated optical circuits have been reviewed by Richard Soref, *Reconfigurable Integrated Optoelectronics*, Advances in OptoElectronics 2011, Article ID 627802. As described herein, generally, local modifications of the refractive index are used in order to reconfigure an existing design. However, since changing the refractive index of a material relate to physical effects with only weak implications, a reconfiguring of a currently available integrated optical circuit is usually limited to small modifications which, at the same time, require high voltages or input powers. In addition, a reconfigurable optical circuit according to the state of the art is inherently constrained to return to its original state after the input power is switched off.

Furthermore, limitations exist with respect to implementing integrated optical circuits with user-defined output functions. Since such circuits generally employ facilities on a sub-wavelength scale, sophisticated processing techniques are required for their manufacturing, which causes that these kinds of circuits are rather unfeasible for a vast majority of applications. On the other hand, integrated optical circuits are known to offer a superior performance over electronic circuits in terms of speed, bandwidth, and immunity to electro-interference. Consequently, integrated optical circuits could provide a number of desired features which would be highly interesting for a number of applications in various fields.

Within this regard, it may be mentioned that a comparative challenge exists in the field of integrated electrical circuits, which are out of reach for virtually all end users due to stringent fabrication requirements for their manufacturing. Within this respect, the advent of a field-programmable gate array (FPGA), which provides electronic basics even for complex electronic functionalities, made integrated electrical circuits available to end users. For this purpose, the raw and unconnected FPGA may be manufactured in a standard form, thereby employing high-end production facilities. Thereafter, the electrical contacts required to eventually obtain the integrated electrical circuit, are finally laid out in the FPGA, a task which may be performed by the end user.

US 2013/0223788 A1 and N. Lindenmann, G. Balthasar, D. Hillerkuss, R. Schmogrow, M. Jordan, J. Leuthold, W. Freude, and C. Koos, *Photonic wire bonding: a novel concept for chipscale interconnects*, Optics Express 17667, Vol. 20, No. 16, 30 Jul. 2012, disclose the concept of photonic wire bonding, wherein polymer wave guides with three-dimensional free-form geometries are used in order to bridge a gap between nanophotonic circuits which are located on different chips. Herein, a fabrication of single-mode photonic wire bonds was demonstrated by employing direct writing photon lithography, such as direct-laser writing. In addition, it is mentioned that photonic wire bonding is well suited for an automatic mass production, thus expecting the technology to enable optical multi-chip systems with enhanced performance and flexibility.

Problem to be Solved

It would be therefore be highly desirable to provide an optical analogon of the FPGA, wherein the optical analogon would constitute a preliminary optical chip which would comprise building blocks suitable for integrated optical circuits, wherein the building blocks could be pre-manufactured, while the optical connections required for the desired functionality could subsequently be provided by the end user.

It is therefore an objective of the present invention to provide a nanophotonic device, an integrated optical circuit, and methods for manufacturing the nanophotonic device and the reconfigurable integrated optical circuit as well as for reconfiguring the integrated optical circuit in order to overcome the above-mentioned problems and shortcomings of the present state of the art.

SUMMARY OF THE INVENTION

This problem is solved by a nanophotonic device, an integrated optical circuit, and methods for manufacturing the nanophotonic device and the integrated optical circuit as well as for reconfiguring the integrated optical circuit with the features of the independent claims. Preferred embodiments, which might be realized in an isolated fashion or in an arbitrary combination, are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

The present invention discloses a new route to integrated optical circuits, in particular to optical-field writable arrays. By combining planar photonic fabrication techniques with procedures for providing photonic wires, such as photonic wire bonding, in particular direct-laser writing, a nanophotonic device which exhibits a flexible architecture may be provided, wherein an integrated optical circuit may be designed by an end user without a necessity of requiring nanostructuring equipment. Consequently, the present invention may provide a technology platform which combines nanophotonics and direct-laser writing which, nevertheless, may remove the requirement for sophisticatic nanofabrication facilities, including such technologies like electron-beam lithography, dry etching with reactive ions and fiber coupling. Thus, the technically challenging processing steps which may be required for manufacturing the integrated optical circuit may preferably be performed without involving the end user. As a result, a standardized and preferably optimized photonic integrated optical circuit may be used, which may lead to a high-yield and a simplified fabrication procedure preferably be performed before the preliminary nanophotonic device may be provided to the end user who may eventually finalize the integrated optical circuit by introducing connections between at least two nano-optic components located on the nanophotonic device by employing a comparatively simple technique, such as direct-laser writing. Thus, the present invention may intend to combine two complimentary manufacturing approaches into a unified technology, i.e. a combination of planar sub-wavelength lithography and three-dimensional direct-laser writing. Within this regard, a key feature may, thus, be a systematic approach to reliably and efficiently connect a nanoscale object, in particular a number of nanoscale objects to a macroscopic system, by which approach a gap which usually exists between basic research and industrial application may be bridged.

In a first aspect, the present invention relates to a nanophotonic device. As further used herein, the "nanophotonic device" may refer to an arbitrary device which may be adapted for an application within the field of nanophotonics. Herein, the term "nanophotonics", also denoted as "nano-optics", may usually be employed to describe both the basic research and the industrial applications with regard to light which may interact with structures which may exhibit features with dimensions below the wavelength, in particular below less than half of the wavelength, of the light interacting with the mentioned structure, which may also be denoted as "nanostructure". As further used herein, the term "light" may not be limited to radiation with respect to the visible part of the electromagnetic spectrum between 380 nm and 780 nm but may also extend to the adjoining realms of ultra-violet (UV) light between 10 nm and 380 nm, preferably between 200 nm and 380 nm, more preferably between 300 nm and 380 nm, as well as to the realm of infra-red (IR) light with wavelengths between 1 mm and 780 nm, in particular between 3 µm and 780 nm, more particular between 1200 nm and 780 nm.

In contrast to classical optics, in nanophotonics the interaction of light with nanostructures may lead to a confinement of the electromagnetic field to the respective nanoscale feature which may result in an evanescent near-field which may particularly occur in the vicinity of the nanostructure. Consequently, two nano-optic components, such as a nanophotonic component and a nanophotonic waveguide, may be assigned to be in the "vicinity" of each other as long as a measurable near-field as emitted by one of the nano-optic components may be measurable or detectable by the other of the nano-optic components.

The nanophotonic device according to the present invention comprises a substrate. As further used herein the "substrate" may refer to a usually planar body on top of which at least one layer may be placed, in particular for manufacturing a more complex device. With regard to the present invention, the substrate comprises an optically transparent material, preferably glass or quartz, wherein the optically transparent material may exhibit a first refractive index. As used herein, the term "refractive index" may constitute a material constant which may express a response of the material to an incident light beam with respect to a change from a sine of an angle of incidence to the sine of an angle of refraction. For most optically transparent materials, the refractive indices may take a value between 1 and 3, such as for glass or quartz, in which the refractive index takes a value around 1.5 within the visible spectrum. As a generalization, a "complex refractive index" may also be defined by taking into account that a part of the incident light passing through the material may be absorbed. Such a feature may particularly be observed in a material, such as a thin metallic film, in which the real part of the complex refractive index may be negligible whereas the complex part of the refractive index may take a considerable value. Thus, in nanophotonics, in particular due to the effect of the non-negligible contribution of the imaginary part of the refractive index, surface plasmons may be created on a surface of the material, for example, on the surface of the thin metallic film. The surface plasmons which may be confined to the surface of the respective material may strongly interact with the incident light and may, additionally or as an alternative, be used as waves which may propagate along the surface of the substrate.

Furthermore, the substrate is equipped with at least one reception for at least one external connector, wherein the external connector may, preferably, comprise a fiber connector, such as a single-mode or a multi-mode optical fiber connector. In order to achieve an improved connection of the integral optical device to at least one external device, at least one port may be provided for ensuring a satisfactory contact of the nanophotonic device with the external device. For this purpose, the nanophotonic device may, preferably, be housed inside a macroscopic package which may be equipped with at least one optical fiber convector. This kind of setup may allow fiber-optical patch-cord cables to be connected to at least one nano-optic component as comprised within the nanophotonic device. In a preferred embodiment, at least one input port and at least one output port, more preferably a plurality of input ports and a plurality of output ports, may be provided, thus allowing implementing at least one integrated optical circuit, preferably a plurality of integrated optical circuits, within the nanophotonic device. Therefore, the at least one external connector may be connected to a connector waveguide which may be attached to a corresponding port in the nanophotonic device, in particular, for later providing a connection from the connector waveguide to the at least one nano-optic component as located within the nanophotonic device.

Furthermore, the nanophotonic device according to the present invention comprises at least at least one set of nano-optic components, wherein the nano-optic component is one of a nanophotonic waveguide or a nanophotonic component, wherein the nanophotonic component is nano-optically coupled to at least one nanophotonic waveguide, which may be located on a top of the substrate. As used herein, the term "top" may refer to one side of an extended planar substrate on which the respective nano-optic components may be located while the other side of the extended planar substrate may be kept free of any nano-optic components and used for other purposes but may, in general, also comprise further nano-optic components. With regard to the present invention, the nano-optic component, i.e. both the nanophotonic waveguide and the nanophotonic component, may comprise a material which may exhibit a second refractive index, wherein a value of the second refractive index may exceed the value of the first refractive index. Such a difference with regard to the respective refractive indices may particularly be useful in order to obtain a tight modal confinement of a light wave travelling along the respective nano-optic component.

In a particularly preferred embodiment, wherein material with the first refractive index may comprise an the optically transparent material like glass or quartz, a layer of a wide electronic band gap material may be placed on top of the substrate, wherein from the layer of the of a wide electronic band gap material the desired nano-optic components may be created. The wide electronic band gap material may particularly be useful in order to enable a broad-band optical transparency within the layer. With regard to the present invention, the wide electronic band gap material may particularly be selected to comprise III-nitride semiconductors, such as silicon nitride or aluminum nitride, or, in a particular case, wherein the nano-optic device may be especially adapted for a use within the infra-red spectral range, to comprise silicon which usually exhibits the required properties within the infra-red spectral range.

As already mentioned above, the at least one set of nano-optic components comprises one of a nanophotonic waveguide or a nanophotonic component, wherein the nanophotonic component is nano-optically coupled to at least one nanophotonic waveguide. As further used herein, the term "nanophotonic waveguide" may refer to a structure located on the top of the substrate which may primarily perform a function of guiding a light wave along the nanostructure of the waveguide primarily for its transport. For this purpose, desired waveguiding properties may be achieved by selecting a defined thickness of the waveguiding layer and/or by choosing a specific width of the waveguiding layer which may be provided as a planar waveguide. Within this regard, at least one set of nanophotonic waveguides may be provided which may be distinguished according to their inherent function. Within a first regard, at least one set of nanophotonic waveguides may function as the connector waveguides for providing a connection to at the least one external connector via the reception. Within a second regard, at least one further set of nanophotonic waveguides may function as the nano-optic components attached to the at least one nanophotonic component or located in its vicinity. Within a third regard, at least one further set of nanophotonic waveguides may function as additional nanophotonic waveguides which may be located on the substrate, wherein the additional nanophotonic waveguide may neither be attached to the at least one nanophotonic component nor be located in its vicinity but may be placed as an isolated set of nano-optic components which may be addressed separately. In a particularly preferred embodiment, several different sets of nanophotonic waveguides geometries may, thus, be provided on the same substrate of the nanophotonic device, thus, allowing an implementation of specific desires or requirements.

As further used herein, the term "nanophotonic component" may refer to an arbitrary nano-optic component located on the top of the substrate of the nanophotonic device which may, in addition to guiding a light wave primarily for its transport, be able to influencing at least one property of the light which may interact with the respective nanophotonic component. Particularly preferred examples may comprise ring resonators, directional couplers, such as beam splitters, or phase-sensitive elements, such as Mach-Zehnder interferometers. Examples of particularly preferred nanophotonic components are described below in more detail.

According to the present invention, the nano-optic components are provided in a form of at least one set. As used herein, the term "set", which may also be denoted as a "library", may comprise a wide range of single nano-optic components provided on the same nanophotonic device, wherein each set of nano-optic components may be provided as a plurality of copies of the same nano-optic component, such as with varying parameters, wherein at least two of the nano-optic components within the set may differ with respect to at least one property which may be a physical property, such as a geometrical property, being relevant to an optical property of the nano-optic component, in order to provide a specific nano-optic library element which may be configurable for nearly every desire of the end user. As an example, a number of ring resonators which comprise the same or different diameters, wherein the geometrical diameter of the ring resonator may determine an optical resonance frequency of the ring resonator, may be provided as a set of nanophotonic components on the same substrate, thus providing a wide range of predefined filter configurations from which an end user may be able to choose from. A further example may be a set of nanophotonic waveguides, wherein at least some of the nanophotonic waveguides may differ from each other by their width and/or thickness, such as allowing different manners of modal propagation of a lightwave along the respective waveguide. Particularly in order to achieve a high integration density, a separation distance between individual nano-optic library elements on the nanophotonic device may be minimized. This may also allow providing a number of different or, alternatively or in addition, the same individual nano-optic library elements which may be employed within the same integrated photonic circuit or within one of multiple integrated photonic circuits implemented on the nanophotonic device.

In a particularly preferred embodiment of the present invention, a nano-optical coupling of the nanophotonic component to the at least one nanophotonic waveguide may comprise one of the nanophotonic component being attached to the at least one nanophotonic waveguide or the nanophotonic component being located in the vicinity of the at least one nano-photonic waveguide. As already described above, the "vicinity" between two nano-optic components may be defined in a manner that a measurable or detectable near-field coupling between two nano-optic components, such as by an evanescent field, may exist. Irrespective of the fact whether the nanophotonic waveguide is actually attached to the nano-photonic component or rather located in the vicinity of the nanophotonic component, the respective nanophotonic waveguide in such a manner being in a defined relationship to a specific nanophotonic component may, thus, ensure that the respective nanophotonic component may be nano-optically coupled to the corresponding nanophotonic waveguide in order to be addressable within the integrated optical device from the outside, such as from the at least one external device as mentioned above.

Furthermore, the nanophotonic device is arranged in a manner that at least one of the nanophotonic waveguides is selectively coupleable to at least one of the connector waveguides. This feature may allow, after providing the substrate of the nanophotonic device, on which at least one set of nano-optic components is located, implementing the desired functionality of the nanophotonic device as required by the end user by selectively introducing connecting means between at least one of the nanophotonic waveguides and at least one of the connector waveguides. As used herein, the term "selectively" refers to a particularly advantageous feature of the nanophotonic device according to the present invention which allows coupling of respective ends of the nanophotonic waveguides as present on the substrate or not, i.e. some of the respective ends of the nanophotonic waveguides as present on the substrate may be left uncoupled, such as according to a corresponding desire of the end user. As a result, the feature of a selective coupleability of the mentioned nano-optic components may, thus, lay the basis for the integrated optical circuit as further provided by the present invention.

In a further aspect, the present invention relates to an integrated optical circuit, wherein, in addition to at least one nanophotonic device as described above and/or below, the integrated optical circuit comprises at least one photonic wire, wherein the photonic wire actually connects at least one of the nanophotonic waveguides to at least one of the connector waveguides. For this purpose, the at least one nanophotonic waveguide may comprise at least two ends, wherein at least one end of the nanophotonic waveguide may be connected to at least one connector waveguide by employing the at least one photonic wire. According to the present invention, the integrated optical circuit may, therefore, comprise at least two photonic wires which allow connecting at least one end of the nanophotonic waveguide to the at least one connector waveguide while the other end of the nanophotonic waveguide may be connected by the other of the at least two photonic wires to the same, or, preferably, to another connector waveguide, or to an end of an other nanophotonic waveguide as comprised on the surface of the integrated optical circuit. It may be considered as a particular advantage of the present invention that the photonic wire, preferably, a multitude of photonic wires or a plurality of photonic wires, may be employed in order to implement a multitude of connections or a plurality of between various nanophotonic waveguides as already described above.

Consequently, after providing the nanophotonic device, on which substrate at least one set of nano-optic components is located, the desired functionality of the integrated optical circuit as, for example, desired or required by the end user may be implemented by introducing at least one connection between the respective nanophotonic waveguides by attaching at least one photonic wire between at least two ends of at least two different nanophotonic waveguides. In a particularly preferred example, the photonic wire may, therefore, comprise a polymer waveguide, wherein the polymer waveguide may be located above the top of the substrate. Such a kind of polymer waveguides may be obtained at arbitrary positions by using direct-laser writing. Since access to a third dimension is possible by employing direct-laser writing in contrast to building traditional planar devices, waveguide cross-overs and long-range connections may easily be obtained. Thus, the polymer waveguide may exhibit a three-dimensional free-form geometry. Consequently, high precision available to planar fabrication may, thus, be combined with high flexibility being inherent to direct-laser writing.

In a preferred embodiment, the at least one nanophotonic waveguide may be equipped with a tapering section at least at one of its ends. As used herein, the term "tapering section" may describe a region within the waveguide which may force the optical mode of a travelling light wave to become enlarge. The tapering may, in particular, be useful for an efficient coupling of the photonic wire with the nanophotonic waveguide. It may, therefore, be particularly preferred to provide, for each type of nanophotonic waveguide as employed within the nanophotonic device, optimized tapering sections which may ensure that the same type of photonic wires may be used as a connector to all nanophotonic waveguides of the same dimension. In a particularly preferred embodiment, the nanophotonic device may be provided in a manner that the end user may not be required to perform a planar nanostructuring which might, preferably, be performed by the manufacturing together with the housing of the nanophotonic device. The end user may, thus, only be responsible for providing at least one desired connection between the nano-optic components comprised on the nanophotonic device. For this purpose, nanofabrication tools may be employed in order to implement a "library" of nano-optic components on the nanophotonic device.

In addition, the photonic wire connection as provided by direct-laser writing may particularly exhibit a low propagation loss, thus, preferably allowing joining more than one nano-optic component from different libraries into a single chain of connections. In a particularly preferred embodiment, the term "chain of connections" may refer to a connection which reaches from the at least one input port to the at least one output port by using at least two photonic wires, wherein one of the photonic wires may connect one of the connector waveguide being coupled to one of the input ports to one of the nanophotonic waveguides. Within this regard, one other of the photonic wires may further connect the same nanophotonic waveguide or a further nanophotonic waveguide, which may nano-optically be coupled to the same nanophotonic component, or to one of the connector waveguides which may be coupled to one of the output ports. As will be described below as examples in more detail, it may, thus, be feasible to implement at least one specific chain of connections according to the desires or requirements of the end user, thus obtaining a specific integrated optical circuit on the nanophotonic device.

In addition, the top of the substrate of the integrated optical circuit may partially be covered by a protection layer, such as an optical buffer, preferably comprising a flowable oxide, wherein the protection layer may particularly extend outside an area on the top of the substrate where the at least two photonic wires may be located. The protection layer may, thus, protect a region on top of the substrate which may be excluded from a further reconfiguring of the integrated optical circuit.

In a further aspect, the present invention relates to an arrangement, wherein at least two nanophotonic devices and/or at least two integrated optical circuits are comprised within a single device. This may, particularly, be achieved by stacking several nanophotonic devices and/or integrated optical circuits as described above into a stack or, alternatively or in addition, by laterally connecting individual nanophotonic devices and/or integrated optical circuits. As an example, the arrangement may be useful in a case where a use of different substrate materials and/or different materials for the nano-optic components may be preferred.

In a further aspect, the present invention relates to a method for manufacturing a nanophotonic device, in particular the nanophotonic device as described above and/or below. The method for manufacturing the nanophotonic device according to the present invention comprises at least the following steps (a) to step (c), wherein, however, additional steps may further be performed. Preferably, the method steps (a) to (c) may be performed in the given order, commencing with step (a), continuing with step (b), and finishing with step (c), wherein, however, a subsequent step may partially be performed concurrently with a previous step.

For further details concerning the various methods according to the present invention, reference may be made to the description of the nanophotonic device and/or the integrated optical circuit as comprised above and/or below.

According to step (a), a substrate, preferably the substrate as described above, is provided. Accordingly, the substrate may comprise an optically transparent material with a first refractive index, and the substrate is equipped with at least one reception for at least one external connector, wherein the reception is coupled to at least one connector waveguide.

According to step (b), a layer of a material is placed on top of the substrate, preferably by depositing the material with a second refractive index as a thin film on the substrate directly or on top of an underlying buffer layer deposited onto the substrate before.

According to step (c), at least one set of nano-optic components is created within the layer of the material as placed on top of the substrate. Herein, the nano-optic component is one of a nanophotonic waveguide or a nanophotonic component, wherein the nanophotonic component is nano-optically coupled to at least one nanophotonic waveguide. The creating of the nano-optic components, may, preferably, comprise a first step of high resolution lithography, followed by a second step of thin film structuring, in particular through etching. By application of step (c), thus, the at least one set of nano-optic components, which may also be assigned as elements of a nano-optic set or library, may be created. Furthermore, at least one of the nanophotonic waveguides is, thus, selectively coupleable to at least one of the connector waveguides.

In a further aspect, the present invention relates to a method for manufacturing an integrated optical circuit, in particular the integrated optical circuit as described above. The method for manufacturing the integrated optical circuit according to the present invention comprises at least the following steps (a) to step (d), wherein, however, additional steps, such as step (e) or any other step not particularly described here, may further be performed. Preferably, the method steps (a) to (d) may be performed in the given order, commencing with step (a), continuing, first, with step (b) and, then, with step (c), and finishing with step (d), wherein, however, a subsequent step may partially be performed concurrently with a previous step.

Herein, the steps (a) to (c) as described above are applicable in the method for manufacturing the integrated optical circuit in a corresponding manner.

According to step (d), at least one photonic wire is provided, wherein the photonic wire connects at least one of the connector waveguides as being connected to the reception to the external connector to at least one of the nanophotonic waveguides. As already described above, at least two photonic wires may allow connecting at least one end of the nanophotonic waveguide to the at least one connector waveguide while the other end of the nanophotonic waveguide may be connected by the other of the at least two photonic wires to the same, or, preferably, to another connector waveguide, or to an end of an other nano-photonic waveguide as comprised on the surface of the integrated optical circuit. Thus, selected waveguides on the nanophotonic device may be joined together by creating a further photonic wire, preferably, as a chain of connections from the at least one input port to the at least one output port. A selected waveguide may, preferentially, be connected to at least one end of a photonic wire in a manner that the coupling reaches from the two-dimensional planar layout to the flexible three-dimensional space, in particular by creating a polymer waveguide by direct-laser writing which may, thus, be located above the top of the substrate. This kind of implementation may particularly be achieved by using free-standing bridge waveguides which may be guided away from the surface into the air and then touching the substrate again at the desired target waveguide. Advantageously, a polymer waveguide provided with such kinds of properties may also be feasible to cross over other nano-optic components and/or over or below other photonic wires without distorting a propagating mode of a light wave which may travel along the nano-optic components or the photonic wire, respectively.

In a preferred embodiment, the photonic wires may be provided after the nanophotonic device may have been inserted into a housing and connected to a packaging box. Within this embodiment, it may be particularly preferred to perform a further step (e) according to the present method for manufacturing the integrated optical circuit. According to step (e), the top of the substrate of the integrated optical circuit may partially be covered with a protection layer in a manner that the protection layer may extent outside an area of the top substrate where the photonic wires may be located. In a preferred example, the protection layer may thus comprise a flowable oxide. The protecting of specific regions on the top of the substrate of the integrated optical circuit may, thus, ensure that the protected areas may not be affected by a method for reconfiguring the integrated optical circuit as will be described below.

In a further aspect, the present invention relates to a method for reconfiguring the integrated optical circuit. According to this method, after the above-mentioned step (d) or, if applicable, after the above-mentioned step (e), at least one photonic wire as comprised within the integrated optical circuit is removed. Therefore, when the actual integrated optical circuit may no longer be desired or required for any reason, at least one photonic wire may be removed again and may or may not be replaced (rewritten) by a further photonic wire to be attached at the same but, in general, at a different place compared to the removed photonic wire. By using this reconfiguring method, the original integrated optical circuit may be recovered or may be "reset" to the preliminary nanophotonic device. For removing at least one of the photonic wires, a known removal technique, in particular the technique of plasma oxidization may be employed. This technique may be particularly adaptable in a case where the photonic wires may be made from a polymer base and are, thus, organic. After removing at least one photonic wire, a new optical integrated circuit may, thus, be implemented in the integrated optical circuit by providing at least one further polymer wire, such as by using direct-laser writing. Consequently, the integrated optical circuit according to the present invention may be re-used for several programming implementations and may, thus, provide a cost-efficient programming platform for the end user.

In a further aspect, the present invention relates to a use of an integrated optical circuit as a reconfigurable integrated optical circuit, in particular, as an optical field writable array. Within this regard, it may be emphasized that integral optical circuits may be considered as central building blocks in modern telecommunication systems. However, due to their versatility in design and functionality they may be applicable to a much larger application spectrum after they may be manufactured and configured with sufficient ease, such as according to the present invention. The present invention, thus, provides a flexible platform which may be easy to be configured and adaptable to a wide range of desires and needs which may, thus, enable a considerably wide diffusion of integrated optical circuits.

The integrated optical circuit according to the present invention may be applied in the field of signal processing, including optical communication and network control. By this use, customized optical filters may be created, for example, for optical encoding, wave length division multiplexing and signal routing. In addition, specialized filters may be employed for noise suppression. Other areas of application may comprise sensing and optical data processing as well as high speed computation, such as in data centers, or for secure communication. Furthermore, the integrated optical circuit according to the present invention may be suited for prototyping or manufacturing small series of optical systems. In research or development, the nanophotonic devices may, thus, allow for providing specialized integrated optical circuits without a requirement to fabricate expensive integrated optical circuit in a preliminary stage. Particularly due to their reconfiguration ability, the integrated optical circuit may, after reconfiguring, be used again as an approach to a desired system response.

In addition to advantageous features as described above, the present invention may constitute a non-volatile approach and, therefore, may not require an external input for maintaining its functionality. In addition, since completely independent nano-optic components may be joined together arbitrarily via nanophotonic waveguides by employing photonic wires, both small and large changes with regard to the functionality of the integrated optical circuit may be implemented with the same ease. In contrast to existing integrated optical circuits, the nanophotonic device and the integrated optical circuit according to the present invention may, thus, provide the advantage that the photonic wires may be implemented as well as reconfigured by the end user. Whereas existing devices may only allow a fine tuning of the integrated optical circuit, here the overall setup may be completely altered in a manner that the present nanophotonic device and the integrated optical circuit may be considered as much more flexible compared to other approaches.

SHORT DESCRIPTION OF THE FIGURES

Further optional features and embodiments of the invention will be disclosed in more detail in the subsequent description of preferred embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

Figure 2:
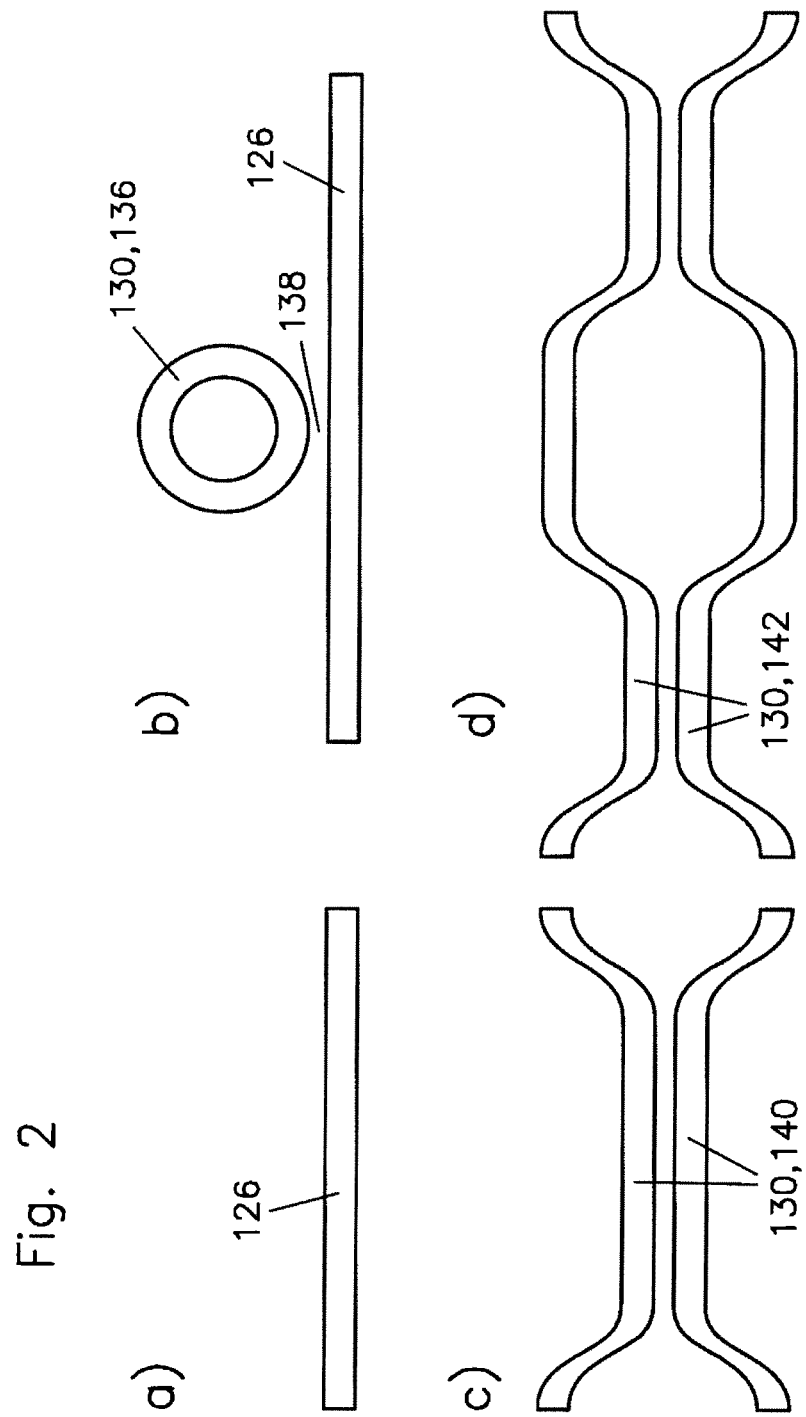
Figure 3:
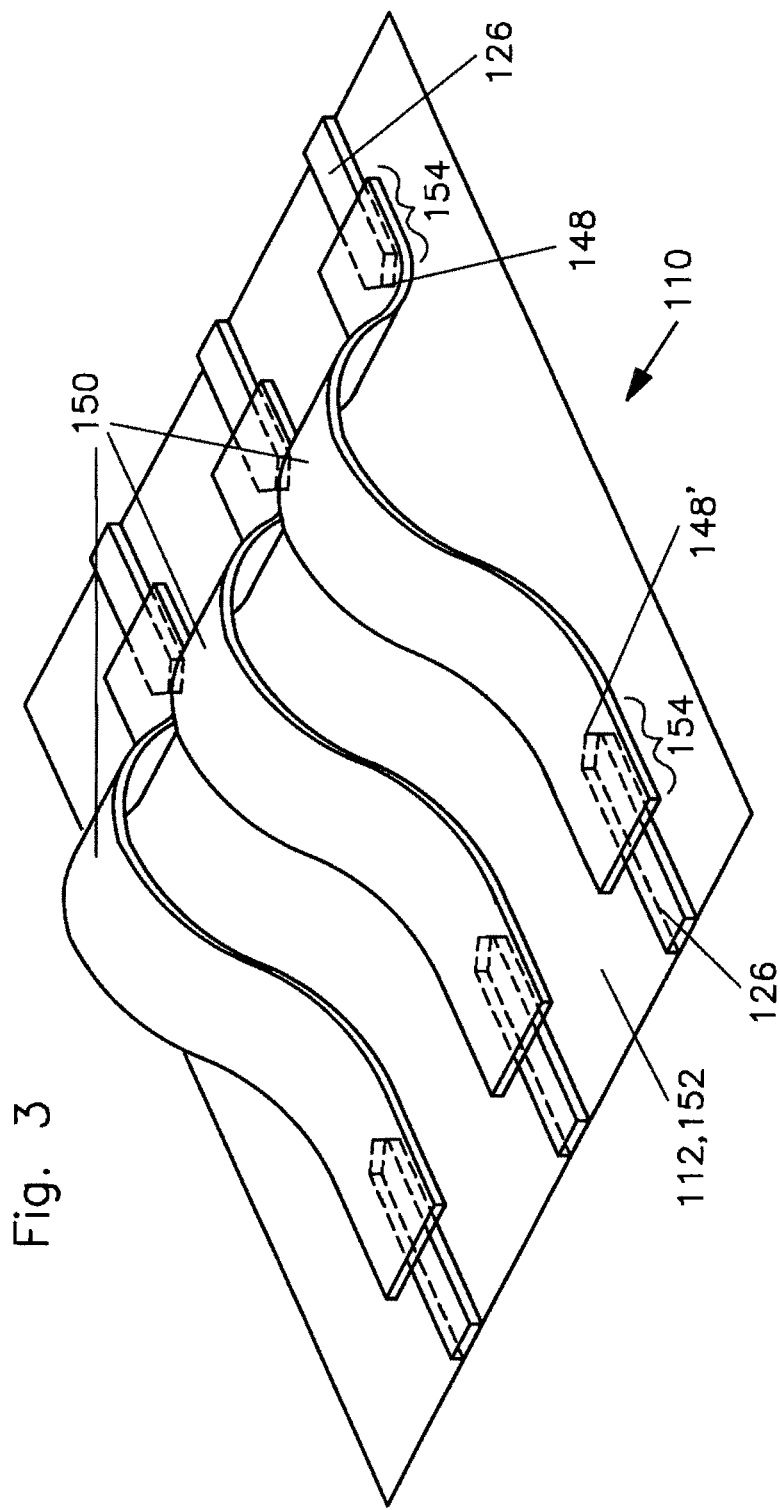

In the Figures:

FIG. 1 shows a schematic view of a preferred embodiment of an the integrated optical circuit according to the present invention;

FIG. 2 schematically displays a number of nano-optic components: a) a nanophotonic waveguide; b) a nanophotonic ring resonator being located in the vicinity of a nanophotonic waveguide; c) a nanophotonic directional coupler; and d) a Mach-Zehnder interferometer as a phase-sensitive element; and FIG. 3 schematically displays a number of photonic wires comprising polymer waveguides being located above the top of the substrate of the integrated optical circuit.

DETAILED DESCRIPTION OF THE EMBODIMENTS

FIG. 1 shows a top view of a schematic depiction of an integrated optical circuit 110 according to the present invention. Within this regard, the integrated optical circuit 110 here comprises an optically transparent material with a first refractive index $n_1$, in particular, glass or quartz, as a substrate 112. In this particular example as depicted in FIG. 1, the substrate 112 comprises two sides 114, 114' arranged opposite to each other, wherein each side 114, 114' is equipped with eleven fiber connectors 116, wherein each connector 116 may serve as a reception 116 which may be connected with an external connector 118, in particular an optical fiber. In the particular example as presented in FIG. 1, two of the receptions 116 may serve as an input port 120, 120' whereas two others of the receptions 116 may serve as an output port 122, 122'. However, other configurations are possible, such as where only one input port 120, more than two input ports 120, 120' . . . , only one output port 122, or more than two output ports 122, 122' . . . may be implemented. In addition, the receptions 116 may also be adapted to receive other kinds of external connectors 118 beside optical fibers, such as electrical connectors. However, for implementing an all-optical device, optical fibers are preferred as the external connectors 118.

Preferably, each reception 116, whether being assigned as input port 120, 120' . . . or as output port 122, 122' . . . , is attached to a connector waveguide 124 as located on the substrate 112. Each connector waveguide 124 may be created in the same manner as a nanophotonic waveguide 116 as described above and/or below. The particular example of the integrated optical circuit 110 as depicted in FIG. 1 comprises various kinds of nanophotonic waveguides 116. Beside the connector waveguides 124 as already mentioned, it further comprises nanophotonic waveguides 126, 128 being attached to a nanophotonic component 130, nanophotonic waveguides 126, 132 being in the vicinity of the nanophotonic component 130, or additional nanophotonic waveguides 126, 134 which are neither attached to the nanophotonic component 130 nor located in its vicinity. In the present example as depicted in FIG. 1, the nanophotonic waveguides 126, irrespective of their specific location on the substrate 112 of the integrated optical circuit 110, the nanophotonic waveguides 126 as well as the photonic components 130 comprise a material with a second refractive index $n_2$, wherein the second refractive index $n_2$ exceeds the first refractive index $n_1$ of the optically transparent material as comprised by the substrate 112 as follows:

$$n_2 > n_1 \quad (1)$$

A particularly suitable material are III-nitride semiconductors, preferably silicon nitride or aluminum nitride, or, if only infra-red wavelengths may travel along the waveguides, silicon. Both the nanophotonic waveguides 126 as well as the nanophotonic components 130 are made, according to the present invention, preferably from a layer of the material with the second refractive index $n_2$ which is placed, preferably by a known deposition technique, on top of the substrate and in which both the nanophotonic waveguides 126 and the nanophotonic components 130 are inscribed, thus, allowing or assembling many different nanophotonic waveguides 126 as well as a plurality of nanophotonic components 130 on the same substrate 112.

With respect to the nano-optic components, which comprise nanophotonic waveguides 126 and nanophotonic components 130, wherein the nanophotonic components 130 are attached to a nanophotonic waveguide 126, 128 or located in the vicinity of a nanophotonic waveguide 126, 132, a preferred selection may be obtained from FIG. 2. As a preferred example, FIG. 2a) schematically depicts a nanophotonic waveguide 126 which may be used for any of the waveguiding purposes as described above and/or below. FIG. 2b) shows a schematic view of a ring resonator 136 which may, for example, preferably be used as an optical filter. As may be derived from FIG. 2b), the optical filter 136 may be located in the vicinity of the nanophotonic waveguide 126, only separated by a comparatively short distance 138. Herein, the distance 138 may be selected in a manner to allow an evanescent electrical near-field to migrate between the ring resonator 136 and the corresponding nanophotonic waveguide 126 in any of the two possible directions. As already described above, the distance 138, thus, enables an electromagnetic connection between the ring resonator 136 as the nanophotonic component 130 and the nanophotonic waveguide 126 which are placed in the vicinity with respect to each other.

In FIG. 2c), a directional coupler 140 is presented as a further example of the nanophotonic component 130. For example, the directional coupler 140 may be used as a beam splitter, thus, allowing a single incident light beam to further travel into at least two separate directions. As a further example for the nanophotonic component 130, FIG. 2d) presents a Mach-Zehnder interferometer 142 which may, for example, be applied as a phase-sensitive element, thus, allowing to adjust a further transport of an incident electromagnetic wave to depend on its relative phase. In addition to the examples of nanophotonic components 130 as schematically depicted in FIG. 2, further nanophotonic components 130 may also be arranged on the substrate 112 of the integrated optical circuit 110.

With respect to the nanophotonic components 130, FIG. 1 schematically exhibits a particular advantage of the present invention. The nanophotonic components 130 as well as the additional nanophotonic waveguides 134 may be provided as many copies which may each be arranged next to each other in a form of a set or library 144, wherein the elements of each set 144 may be produced with the same but also with varying device parameters, such as a diameter 146 of the ring resonator 136. By this way, it may be possible to provide a specific nanophotonic component 130 which might be adapted for any desire or need, such as providing a number of different ring resonators 136 with different diameters 146 as a wide range of filter configurations an end user may be able to choose from.

Further to the present invention, each of the nanophotonic waveguides 126, including the connector waveguides 124 and the additional nanophotonic waveguides 134, comprises two ends 148, 148', wherein in the example according to FIG. 1, where all nanophotonic waveguides 126 have been produced in manner that they are parallel to each other, the first or left ends are denoted by the reference number 148 whereas the second or right ends are denoted by the reference number 148'. However, other configurations may be possible.

As further schematically depicted in FIG. 1, the integrated optical circuit 110 according to the present invention comprises a number of photonic wires 150 being configured to connect at least one of the connector waveguides 124 to at least one nanophotonic waveguide 126 as comprised on the substrate 112. In the particular example as shown in FIG. 1, a first chain of connections between the first input port 120 and the first output port 122 as well as a second chain of connections between the second input port 120' and the second output port 122' are schematically presented. Taking a first example, in the first chain of connections, the right end 148' of the connector waveguide 124 attached to the first input port 120 of the reception 116 is connected by a photonic wire 150 to the left end 148 of a nanophotonic waveguide 126, 128 attached to the nanophotonic component 130, in this example comprising a phase-sensitive Mach-Zehnder interferometer 142. Thereafter, from the right end 148 of the nanophotonic waveguide 126, 128 attached to the Mach-Zehnder interferometer 142, a further nanowire 150 leads to the left end 148 of the connector waveguide 124 attached to the first output port 122 at a reception 116. This exemplary chain of connections from the first input port 120 to the second output port 122, thus, constitutes an uninterrupted path which comprises various constituents, i.e. the connector waveguides 124, the nanophotonic waveguides 126, and the nanophotonic components 130, as provided by the nanophotonic device, and, additionally, the photonic wires 150 which, thus, accomplish the first chain of connections on the integrated optical circuit 110.

As schematically depicted in FIG. 3, the photonic wire 150 comprises a polymer waveguide which may, preferably, be located above the top 152 of the substrate 112. As preferably used with regard to the present invention, such polymer waveguides may, in particular, be written at arbitrary positions by using the technique of direct-laser writing. Since direct-laser writing may provide access to the third dimension above the top 152 of the substrate 112, waveguide cross-overs and long-range connections between distant waveguides may, thus, be provided, thus providing features which are impossible within known planar devices. As further presented in FIG. 3, at the waveguides 126 may be equipped with a tapering section 154 at both of their ends 148, 148'. The tapering sections 154 at the ends 148, 148' of the nanophotonic waveguides 126, particularly, force an optical mode travelling along a specific nanophotonic waveguide 126 to become enlarged. As a result, an efficient coupling of the optical mode as provided by the nanophotonic waveguide 126 to the photonic wire 150 attached to it may, thus, achieved. In a particularly preferred example, for each type of nanophotonic waveguides 126 as present on the nanophotonic device, optimized tapering sections 154 may be fabricated in a manner that the same kind of photonic wires 150 may be used for different nanophotonic waveguides 126 at least of the same dimensions.

Furthermore, as schematically depicted in FIG. 1, a more complex second chain of connections from the second input port 120' to the second output port 122' may be achieved by employing the integrated optical circuit according to the present invention. As depicted here, an incident light wave provided by the optical fiber as external connector 118 to the fiber connector reception 116 of the integrated optical circuit 110, which functions as the second input port 120' of the present integrated optical circuit 110, may travel via the additional nanophotonic waveguide 134 to the nanophotonic waveguide 126, 132 located in the vicinity of the ring resonator 136 as the nanophotonic component 130, via a further nano-photonic waveguide 126, 128 attached to the phase-sensitive Mach-Zehnder interferometer 142 as a further nanophotonic component 130, via another nanophotonic waveguide 126, 128 attached to a further phase-sensitive Mach-Zehnder interferometer 142 as a further nanophotonic component 130 to the further connector waveguide 124 attached to the second output port 122', from where an optical signal as modified within the integrated optical circuit 110 may travel to the optical fiber as external connector 118 inserted into the fiber connector reception 116 at this specific location.

A particular advantage of the integrated optical circuit 110 according to the present invention comprises the fact that the integrated optical circuit 110 may, nevertheless, be modified in a rather flexible way after its manufacturing. It may still be possible, for example by employing a plasma oxidation, to remove one or more of the photonic wires 150 as shown in FIG. 1 and, if required to further provide new photonic wires 150 by using direct-laser writing as described above. Consequently, the present invention provides a reconfigurable integrated optical circuit 110 which may be used as a rewritable integrated optical circuit, such as according to the specific desires or requirements of the end user.

LIST OF REFERENCE NUMBERS 110 integrated optical circuit
112 substrate
114, 114' side of the substrate
116 (fiber connector) reception
118 external connector (optical fiber)
120, 120' input port
122, 122' output port
124 connector waveguide
126 nanophotonic waveguide
128 nanophotonic waveguide attached to nanophotonic component
130 nanophotonic component
132 nanophotonic waveguide located in the vicinity of nanophotonic component
134 additional nanophotonic waveguide
136 ring resonator
138 distance
140 directional coupler (beam splitter)
142 phase-sensitive element (Mach-Zehnder interferometer)
144 set (library) of nano-optic components
146 diameter of ring resonator
148, 148' end of nanophotonic waveguide
150 photonic wire
152 top of substrate
154 tapering section of nanophotonic waveguide

The invention claimed is:

1. A method for manufacturing and reconfiguring an integrated optical circuit, comprising the following steps:
    (a) providing a substrate, wherein the substrate is equipped with at least one reception for at least one external connector, wherein the reception is coupled to at least one connector waveguide;
    (b) placing a layer of a material onto the substrate;
    (c) creating within the layer of the material placed onto the substrate at least one set of nano-optic components, wherein the set of nano-optical components includes at least one nanophotonic waveguide and at least one nanophotonic component, nano-optically coupled to at least one nanophotonic waveguide, wherein at least one of the nanophotonic waveguides is selectively coupleable to at least one of the connector waveguides; and
    (d) providing at least one photonic wire, wherein the photonic wire connects at least one of the connector waveguides to at least one of the nanophotonic waveguides;
    wherein, after step (d), at least one of the photonic wires comprised in the integrated optical circuit is removed, and wherein at least one further photonic wire is provided in the integrated optical circuit.

2. The method according to claim 1, wherein a nano-optical coupling of the nanophotonic component to the at least one nanophotonic waveguide is obtained by one of attaching the nanophotonic component to the at least one nanophotonic waveguide or locating the nanophotonic component in the vicinity of the at least one nanophotonic waveguide.

3. The method according to claim 1, wherein the nanophotonic component is selected from a group comprising a ring resonator, a directional coupler, and a phase-sensitive element.

4. The method according to claim 1, wherein at least two of the nano-optic components within the set differ with respect to at least one property, is created as the set of nano-optic components.

5. The method according to claim 1, wherein a chain of connections from at least one input port to at least one output port is provided by using at least two photonic wires, wherein one of the photonic wires connects the connector waveguide being coupled to the input port to one of the nanophotonic waveguides, and wherein one other of the photonic wires connects the nanophotonic waveguide or a further nanophotonic waveguide being nano-optically coupled to the same nanophotonic component to the connector waveguide coupled to the output port.

6. The method according to claim 1, wherein the photonic wire is provided by photonic wire bonding using direct-laser writing within a polymer material.

7. The method according to claim 1, wherein the photonic wire comprises a polymer waveguide located above the substrate.

8. The method according to claim 1, further comprising the following step:
    (e) partially covering the substrate with a protection layer in a manner that the protection layer extends outside an area of the substrate where the at least two photonic wires are located.

9. The method according to claim 8, wherein, after step (e), at least one of the photonic wires comprised in the integrated optical circuit is removed, and wherein at least one further photonic wire is provided in the integrated optical circuit.

10. The method according to claim 1, wherein the at least one photonic wire comprises a polymer waveguide which is removed by a plasma oxidation.

* * * * *